United States Patent
Watanabe et al.

(10) Patent No.: US 6,749,534 B2
(45) Date of Patent: Jun. 15, 2004

(54) APPARATUS FOR CONTROLLING VEHICLE DRIVE SYSTEM INCLUDING DRIVE POWER SOURCE AND AUTOMATIC TRANSMISSION

(75) Inventors: Kazuyuki Watanabe, Anjo (JP); Naoyuki Sakamoto, Toyota (JP); Atsushi Ayabe, Toyota (JP); Toshimitsu Sato, Toyota (JP); Hiromichi Kimura, Okazaki (JP); Hideaki Ogasawara, Anjo (JP); Mitsuhiro Nakamura, Anjo (JP); Noboru Shibata, Anjo (JP)

(73) Assignees: Toyota Jidosha Kabushiki Kaisha, Toyota (JP); Aisin AW Co., Ltd., Anjo (JP)

( * ) Notice: Subject to any disclaimer, the term of this patent is extended or adjusted under 35 U.S.C. 154(b) by 0 days.

(21) Appl. No.: 10/205,403

(22) Filed: Jul. 26, 2002

(65) Prior Publication Data
US 2003/0022758 A1 Jan. 30, 2003

(30) Foreign Application Priority Data
Jul. 30, 2001 (JP) ........................................ 2001-229616

(51) Int. Cl.⁷ .............................................. B60K 41/04
(52) U.S. Cl. ...................................................... 477/107
(58) Field of Search ................................ 477/107, 108, 477/110, 111, 113

(56) References Cited

U.S. PATENT DOCUMENTS

| | | | | |
|---|---|---|---|---|
| 5,036,729 A | * | 8/1991 | Nitz et al. | 74/866 |
| 5,417,625 A | * | 5/1995 | Yamaki et al. | 477/109 |
| 5,613,920 A | * | 3/1997 | Uno et al. | 477/109 |
| 5,863,275 A | * | 1/1999 | Nozaki et al. | 477/110 |
| 6,432,025 B1 | * | 8/2002 | Kondo et al. | 477/110 |
| 6,497,637 B2 | * | 12/2002 | Takao et al. | 477/108 |

FOREIGN PATENT DOCUMENTS

| JP | 7-139382 | 5/1995 |
|---|---|---|
| JP | 8-58436 | 3/1996 |

* cited by examiner

*Primary Examiner*—Roger Pang
(74) *Attorney, Agent, or Firm*—Oblon, Spivak, McClelland, Maier & Neustadt, P.C.

(57) ABSTRACT

Apparatus for controlling a vehicle drive system including a drive power source, a fluid-operated power transmitting device connected to the drive power source, and an automatic transmission for transmitting a rotary motion of the fluid-operated power transmitting device to vehicle drive wheels such that a speed ratio of the automatic transmission is variable, the apparatus being arranged to increase an output of the drive power source for increasing its speed upon a shift-down action of the automatic transmission so as to increase its speed ratio during a coasting run of the vehicle, and including an output controlling element operable to control the output of the drive power source, and a gradually output increasing device operable upon the shift-down action during the coasting run, for controlling the output controlling element so as to gradually increase the speed of the drive power source at a predetermined rate.

16 Claims, 8 Drawing Sheets

| POSITION | | CLUTCHES AND BRAKES | | | | | | | O.W.C. | |
|---|---|---|---|---|---|---|---|---|---|---|
| | | C1 | C0 | C2 | B1 | B2 | C3 | B3 | F1 | F2 |
| N,P | | × | × | × | × | × | × | ○ | × | × |
| R | | × | × | ○ | × | ○ | × | ○ | × | × |
| D | 1st | ○ | × | × | × | × | × | ○ | ○ | △ |
| | 2nd | ○ | × | × | ○ | × | × | ○ | × | △ |
| | 3rd | ○ | ○ | × | × | × | × | ○ | × | △ |
| | 4th | × | ○ | × | ○ | × | × | ○ | × | △ |
| | 5th | × | ○ | × | ○ | × | ○ | × | × | × |
| 1st-SPEED ENGIN BRAKE | | ○ | × | × | × | ○ | × | ○ | △ | △ |

APPARATUS FOR CONTROLLING VEHICLE DRIVE SYSTEM INCLUDING DRIVE POWER SOURCE AND AUTOMATIC TRANSMISSION

This application is based on Japanese Patent Application Nos. 2001-229616 filed on Jul. 30, 2001, the contents of which are incorporated hereinto by reference.

BACKGROUND OF THE INVENTION

1. Field of the Invention

The present invention relates in general to an apparatus for controlling a drive system for an automotive vehicle, which drive system includes a drive power source and an automatic transmission. More particularly, the invention relates to improvements in techniques for increasing an output of the drive power source so as to prevent a shifting shock of the automatic transmission, upon a shift-down action of the automatic transmission while the vehicle is in a coasting run without a drive force being transmitted from the drive power source to vehicle drive wheels.

2. Discussion of Related Art

There is widely known an automotive vehicle provided with a drive system including a drive power source such as an internal combustion engine, a fluid-operated power transmitting device connected to the drive power source, and an automatic transmission arranged to transmit a rotary motion of the fluid-operated power transmitting device to drive wheels such that a ratio of the input speed of the automatic transmission to its output speed is variable. An example of such a vehicle is disclosed in JP-A-7-139382 wherein a torque converter provided as the fluid-operated power transmitting device is connected to an automatic transmission such as a planetary gear type transmission. The automatic transmission has a plurality of operating positions which have respective different speed ratios and which are selectively established by respective combinations of engaging and releasing actions of a plurality of frictional coupling devices. In such a vehicle, the automatic transmission is shifted down to increase its speed ratio during a coasting run of the vehicle without a drive force being transmitted from the drive power source to the vehicle drive wheels, with an accelerator pedal being held in its non-operated position, for example. An increase in the speed ratio causes an increase in the operating speeds of the fluid-operated power transmitting device and the drive power source. If this increase in the operating speeds takes place in a so-called "reverse power transfer state" while the speed of the drive power source is lower than the output speed of the fluid-operated power transmitting device (which is the input speed of the automatic transmission), there arise a relatively large amount of variation in the drive force due to an inertia of the drive power source, and application of a relatively large load to the frictional coupling devices and other elements of the automatic transmission. In view of these drawbacks, it is considered to positively increase the output and operating speed of the drive power source upon a shift-down action of the automatic transmission. It is also considered to hold the operating speed of the drive power source during the coasting run of the vehicle higher than the output speed of the fluid-operated power transmitting device (the input speed of the automatic transmission), so that the vehicle is driven with a high response to a subsequent operation of the accelerator pedal which takes place at the end of the coasting run. If the speed of the drive power source is increased in the reverse power transfer state while the speed of the drive power source is lower than the output speed of the by fluid-operated power transmitting device, the direction in which a torque is transmitted through the fluid-operated power transmitting device is reversed, so that the fluid-operated power transmitting device is likely to suffer from a shock. To avoid this drawback, it is desirable to positively increase the operating speed of the drive power source upon a shift-down action of the automatic transmission during the coasting run of the vehicle.

If the output of the drive power source is increased to positively increase its operating speed in the reverse power transfer state while the speed of the drive power source is lower than the output speed of the fluid-operated power transmitting device, the speed of the drive power source is abruptly raised due to a comparatively small load acting on the drive power source, so that the direction in which the torque is transmitted through the fluid-operated power transmitting device is suddenly reversed, giving rise to a risk of generation of noise and shock. The vehicle drive system may be placed in the reverse power transfer state, when a fuel-cut control to cut a fuel supply to the drive power source is effected under a predetermined condition, to improve the fuel economy of the vehicle or to apply a drive-power-source brake such as an engine brake to the vehicle, and when any device (e.g., an air conditioning system) operable by the drive power source is activated.

SUMMARY OF THE INVENTION

The present invention was made in the light of the background art discussed above. It is therefore an object of the present invention to provide an apparatus for controlling a vehicle drive system including a drive power source, a fluid-operated power transmitting device and an automatic transmission, which apparatus is capable of reducing operating noise and shock that may be generated due to a change in the direction of transmission of a torque through the fluid-operated power transmitting device, when the output of the drive power source is increased to increase its operating speed upon a shift-down action of the automatic transmission during a coasting run of the vehicle in which the speed of the drive power source is lower than the output speed of the fluid-operated power transmitting device, The object indicated above may be achieved according to the principle of the present invention, which provides an apparatus for controlling a drive system of an automotive vehicle including a drive power source, a fluid-operated power transmitting device connected to the drive power source, and an automatic transmission arranged to transmit a rotary motion of the fluid-operated power transmitting device to drive wheels of the vehicle such that a speed ratio which is a ratio of an input speed of the automatic transmission to an output speed thereof is variable, the apparatus being arranged to increase an output of the drive power source for increasing an operating speed of the drive power source upon a shift-down action of the automatic transmission so as to increase the speed ratio during a coasting run of the vehicle in which the output of the drive power source is not transmitted to the drive wheels, the apparatus comprising: an output controlling element operable to control the output of the drive power source; and gradually output increasing means operable upon the shift-down action of the automatic transmission during the coasting run of the vehicle, for controlling the output controlling element so as to gradually increase the operating speed of the drive power source at a predetermined rate.

In this vehicle drive system control apparatus, the output controlling element is controlled by the gradually output increasing means, to gradually increase the operating speed of the drive power source at the predetermined rate, so that a shock to be generated upon the shift-down action of the automatic transmission can be effectively reduced. Where the gradually output increasing means is operated in a reverse power transfer state of the vehicle drive system in which the speed of the drive power source is lower than the output speed of the fluid-operated power transmitting device, the gradual increase of the speed of the drive power source permits a gradual or slow reversal of the direction in which a torque is transmitted through the fluid-operated power transmitting device, so that the amounts of noise and shock due to the reversal of the torque transmitting direction are effectively reduced.

As the drive power source, an internal combustion engine such as a gasoline engine and a diesel engine may be suitably used. However, a drive power source of any other type may be used. As the fluid-operated power transmitting device, a torque converter and a fluid coupling may be suitably used. The automatic transmission may be preferably constituted by a planetary gear type transmission including a plurality of frictional coupling devices such as clutches and brakes, which are selectively engaged and released to selectively establish a plurality of operating positions having respective different speed ratios. However, the automatic transmission may be other types of multiple-step transmission, such as a two-axes synchronous coupling transmission which is shifted by hydraulic and other actuators, or a continuously variable transmission of belt-and-pulley type whose speed ratio is continuously variable.

According to a first preferred form of the apparatus of this invention, the apparatus further comprises reverse power transfer determining means operable upon the shift-down action of the automatic transmission during the coasting run of the vehicle, for determining whether the drive system is placed in a reverse power transfer state in which the operating speed of the drive power source is lower than an output speed of the fluid-operated power transmitting device, and the gradually output increasing means is operated to control the output controlling element so as to gradually increase the operating speed of the drive power source, when the reverse power transfer determining means has determined that the drive system is placed in the reverse power transfer state.

In the apparatus according to the first preferred form of the present invention described above, the gradually output increasing means is operated when the reverse power transfer determining means has determined that the drive system is placed in the reverse power transfer state. In the reverse power transfer state, therefore, the output controlling element is controlled to gradually increase the speed of the drive power source at the predetermined rate, so that the direction of the torque transmission through the fluid-operated power transmitting device is gradually or slowly reversed, whereby the amounts of noise and shock due to the reversal of the torque transmitting direction are accordingly reduced.

During the coasting run of the vehicle, the output of the drive power source is not transmitted to the vehicle drive wheels to drive the vehicle, usually with the accelerator pedal placed in its non-operated position. During this coasting run, the vehicle drive system is generally placed in the reverse power transfer state in which the operating speed of the drive power source is lower than the output speed of the fluid-operated power transmitting device (which is equal to the speed of the input shaft of the automatic transmission). The vehicle control apparatus of the present invention is effective and advantageous when the gradually output increasing means is operated when the reverse power transfer state of the vehicle drive system is detected by the reverse transfer determining means, as in the first preferred form of this invention described above. In particular, the reverse power transfer state is established when a fuel cut control is effected to improve the fuel economy of the vehicle or to apply a drive-power-source brake to the vehicle in the coasting run of the vehicle. However, the operation of the gradually output increasing means to gradually increase the speed of the drive power source by controlling the output controlling element is effective to reduce the shifting shock, also when the operating speed of the drive power source is held higher than the output speed of the fluid-operated power transmitting device, for enabling the vehicle to be driven with a high response to a subsequent operation of the accelerator pedal which takes place at the end of the coasting run of the vehicle. However, the speed of the drive power source may be rapidly or instantaneously increased to a predetermined target value, when the shift-down action of the automatic transmission is detected or expected to be effected while the speed of the drive power source is higher than the output speed of the fluid-operated power transmitting device. In this case, the gradually output increasing means is not operated.

According to a second preferred form of the present invention, the gradually output increasing means is operated irrespective of whether the drive system is placed in a reverse power transfer state in which the operating speed of the drive power source is lower than an output speed of the fluid-operated power transmitting device. The vehicle drive system may arranged to be placed in the reverse power transfer state when the automatic transmission is shifted down during the coasting run of the vehicle. In this case, the gradually output increasing means is necessarily operated when the shift-down action of the automatic transmission is detected during the coasting run. The vehicle drive system may be arranged to avoid the reverse power transfer state upon a shift-down action of the automatic transmission during a coasting run of the vehicle. In this case, too, the gradually output increasing means is necessarily operated when the automatic transmission is shifted down during the coasting run.

According to a third preferred form of the invention, the output controlling element is operable to change the output of the drive power source, irrespective of an operation of a vehicle accelerating member such as an accelerator pedal by an operator of the vehicle. For example, the output controlling element is an idling speed control valve operable to change an idling speed of the drive power source. Alternatively, the output controlling element is an electronic throttle valve which is controlled by a throttle actuator controllable by the present apparatus. Where the vehicle accelerating member such as an accelerator pedal is mechanically connected to a mechanical throttle valve, the output of the drive power source can be changed by controlling the idling speed control valve, irrespective of an operation of the vehicle accelerating member.

The gradually output increasing means may be adapted to control the output controlling element such that the operating speed of the drive power source is increased at a predetermined constant rate. The gradually output increasing means may be adapted to control the output controlling element such that the operating speed of the drive power source is increased to a predetermined constant value. Alternatively, the gradually output increasing means controls the output controlling element such that the operating speed of the drive power source is increased at a rate which is determined by a kind of the shift-down action of the automatic transmission. Similarly, the gradually output increasing means may be adapted to control the output controlling element such that the operating speed of the drive power source is increased to a target value which is determined by the kind of the shift-down action of the automatic transmission. Further, the gradually output increasing means may be arranged to control the output controlling element such that the operating speed of the drive power source is increased at a rate which is determined by a difference between the operating speed of the drive power source and an output speed of the fluid-operated power transmitting device. Similarly, the gradually output increasing means may be arranged to control the output controlling element such that the operating speed of the drive power source is increased to a target value which is determined by the difference between the operating speed of the drive power source and an output speed of the fluid-operated power transmitting device. The operating speed of the drive power source need not be linearly increased at a constant rate. Namely, the gradually output increasing means may be adapted to control the output controlling element such that a rate of increase of the operating speed of the drive power source continuously varies. Alternatively, the gradually output increasing means may be adapted to control the output controlling element such that the operating speed of the drive power source is initially increased by an initial increase amount which is determined by at least one of the kind of the shift-down action of the automatic transmission and the difference between the operating speed of the drive power source and the output speed of the fluid-operated power transmitting device. In this case, the initial increase amount may be determined on the basis of at least one of the kind of the shift-down action and the speed difference and according to a stored data map or a predetermined equation representative of a predetermined relationship between the initial increase amount and the above-indicated at least one of the kind of the shift-down action and the speed difference. Alternatively, the gradually output increasing means may be adapted to control the output controlling element such that the operating speed of the drive power source is increased at a rate which is determined by the above-indicated at least one of the kind of the shift-down action and the speed difference. In this case, the rate of increase of the operating speed of the drive power source may be determined on the basis of the at least one of the kind of the shift-down action and the speed difference and according to a stored data map or a predetermined equation representative of a predetermined relationship between the rate of increase and the at least one of the kind of the shift-down action and the speed difference.

BRIEF DESCRIPTION OF THE DRAWINGS

The above and other objects, features, advantages and technical and industrial significance of the present invention will be better understood by reading the following detailed description of a presently preferred embodiment of the invention, when considered in connection with the accompanying drawings, in which.

DETAILED DESCRIPTION OF THE PREFERRED EMBODIMENTS

Figure 1:
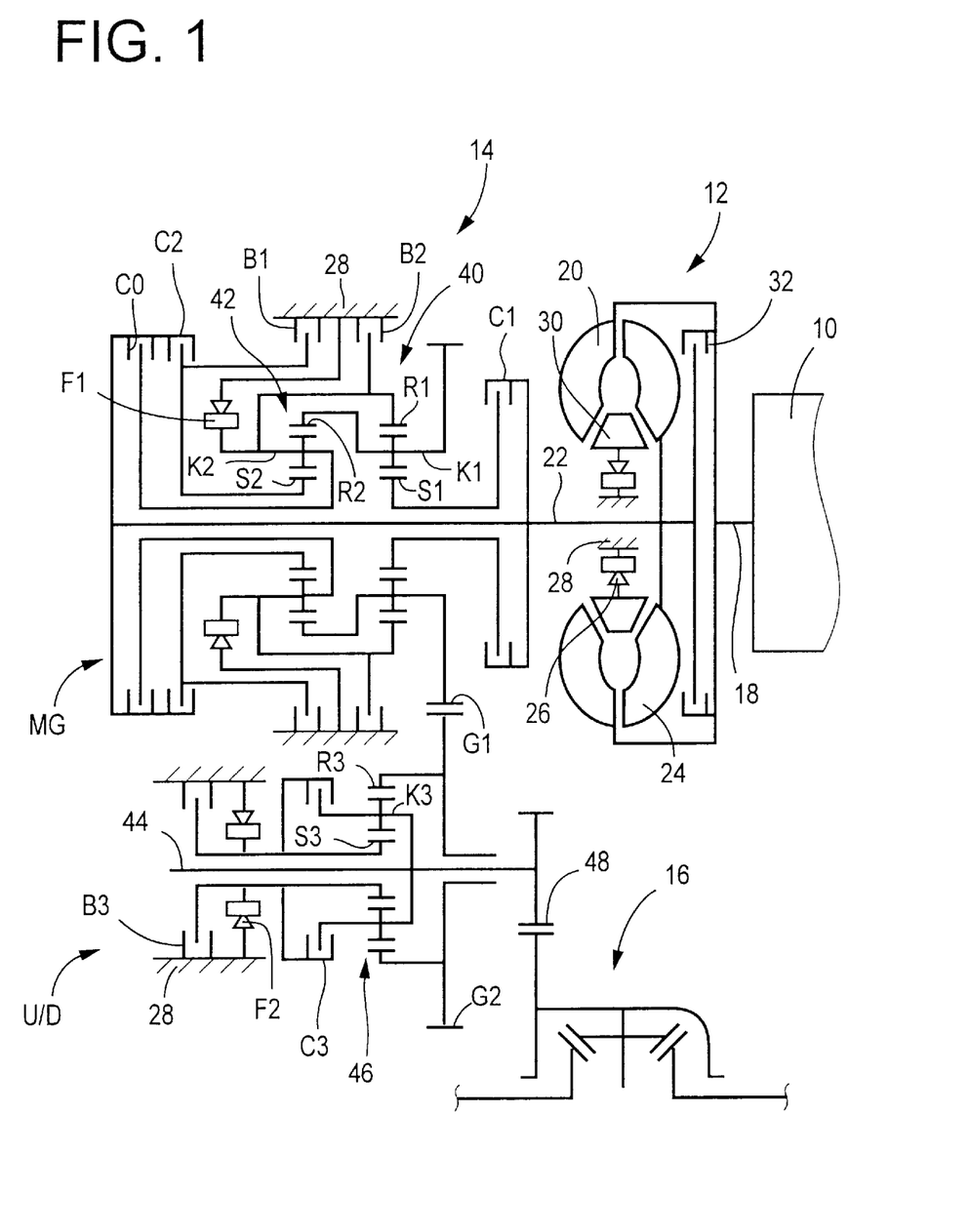
FIG. 1 is a schematic view showing an arrangement of a vehicle drive system to which a control apparatus according to the present invention is applicable.

Referring first to the schematic view of FIG. 1, there is shown an arrangement of a vehicle drive system of a transverse FF (front-engine front-drive) vehicle. The vehicle drive system includes a drive power source in the form of an engine 10 such as a gasoline engine, a fluid-operated power transmitting device in the form of a torque converter 12, an automatic transmission 14, and a differential gear device 16. An output of the engine 10 is transmitted to front drive wheels (not shown) of the vehicle through the torque converter 12, automatic transmission 14 and differential gear device 16. The torque converter 12 includes a pump impeller 20 connected to a crankshaft 18 of the engine 10, a turbine impeller 24 connected to an input shaft 20 of the automatic transmission 14, a stator 30 fixed through a one-way clutch 26 to a stationary member in the form of a housing 28, and a lock-up clutch 32 connected to the input shaft 22 through a damper (not shown).

The automatic transmission 14 includes a planetary gear mechanism of so-called "CR-CR connection" type consisting of a first single-pinion planetary gear set 40 and a second single-pinion planetary gear set 42 which are disposed coaxially with each other on the input shaft 22 and which are constructed such that ring gears of the first and second planetary gear sets 40, 42 are connected to respective carriers of the second and first planetary gear sets 42, 40. The automatic transmission 14 further includes a third planetary gear set 46 disposed on a counter shaft 44 parallel to the input shaft 22, and an output gear 48 which is fixed to one end of the counter shaft 44 and which meshes with the differential gear device 16. Each of the first, second and third planetary gear sets 40, 42, 46 has rotary elements in the form of a gun gear, a ring gear, a planetary gear meshing with the sun gear and the ring gear, and a carrier supporting the planetary gear. Selected ones of the sun gears, ring gears and carriers of the three planetary gear sets 40, 42, 46 are connected to each other through selected ones of clutches C0, C1, C2 and C3, and are fixed to the housing 28 (stationary member) through selected ones of brakes B1, B2 and B3. Further, selected ones of the rotary elements are connected to each other or fixed to the housing 28, through one-way clutches F1 and F2, depending upon the direction of rotation of the rotary elements. Since the differential gear device 16 is symmetrical with respect to its axis (front axles), only an upper half of the device 16 is shown in FIG. 1.

The first and second planetary gear sets 40, 42 disposed on the input shaft 22, the clutches C0, C1 and C2, the brakes B1 and B2, and the one-way clutch F1 cooperate to constitute a main shifting portion MG which is operable to establish four forward drive positions and one rear drive position. On the other hand, the third planetary gear set 46 disposed on the counter shaft 44, the clutch C3, the brake B3 and the one-way clutch F2 cooperate to constitute an auxiliary shifting portion or under drive portion U/D. In the main shifting portion MG, the input shaft 22 is connected to the carrier K2 of the second planetary gear set 42, the sun gear S1 of the first planetary gear set 40, and the sun gear S2 of the second planetary gear set 42, through the clutches C0, C1 and C2, respectively. The ring gear R1 of the first planetary gear set 40 is connected to the carrier K2 of the second planetary gear set 42, while the ring gear R2 of the second planetary gear set 42 is connected to the carrier K1 of the first planetary gear set 40. The sun gear S2 of the second planetary gear set 42 is fixed to the stationary member in the form of the housing 28 through the brake B1, while the ring gear R1 of the first planetary gear set 40 is fixed to the housing 28 through the brake B2. The one-way clutch F1 is disposed between the carrier K2 of the second planetary gear set 42 and the housing 28. A first counter gear G1 fixed to the carrier K1 of the first planetary gear set 40 meshes with a second counter gear G2 fixed to the ring gear R3 of the third planetary gear set 46. In the under drive portion U/D, the carrier K3 and sun gear S3 of the third planetary gear set 46 are connected to each other through the clutch C3, and the brake B3 and the one-way clutch F2 are disposed in parallel with each other between the sun gear S3 and the housing 28.

Figure 2:
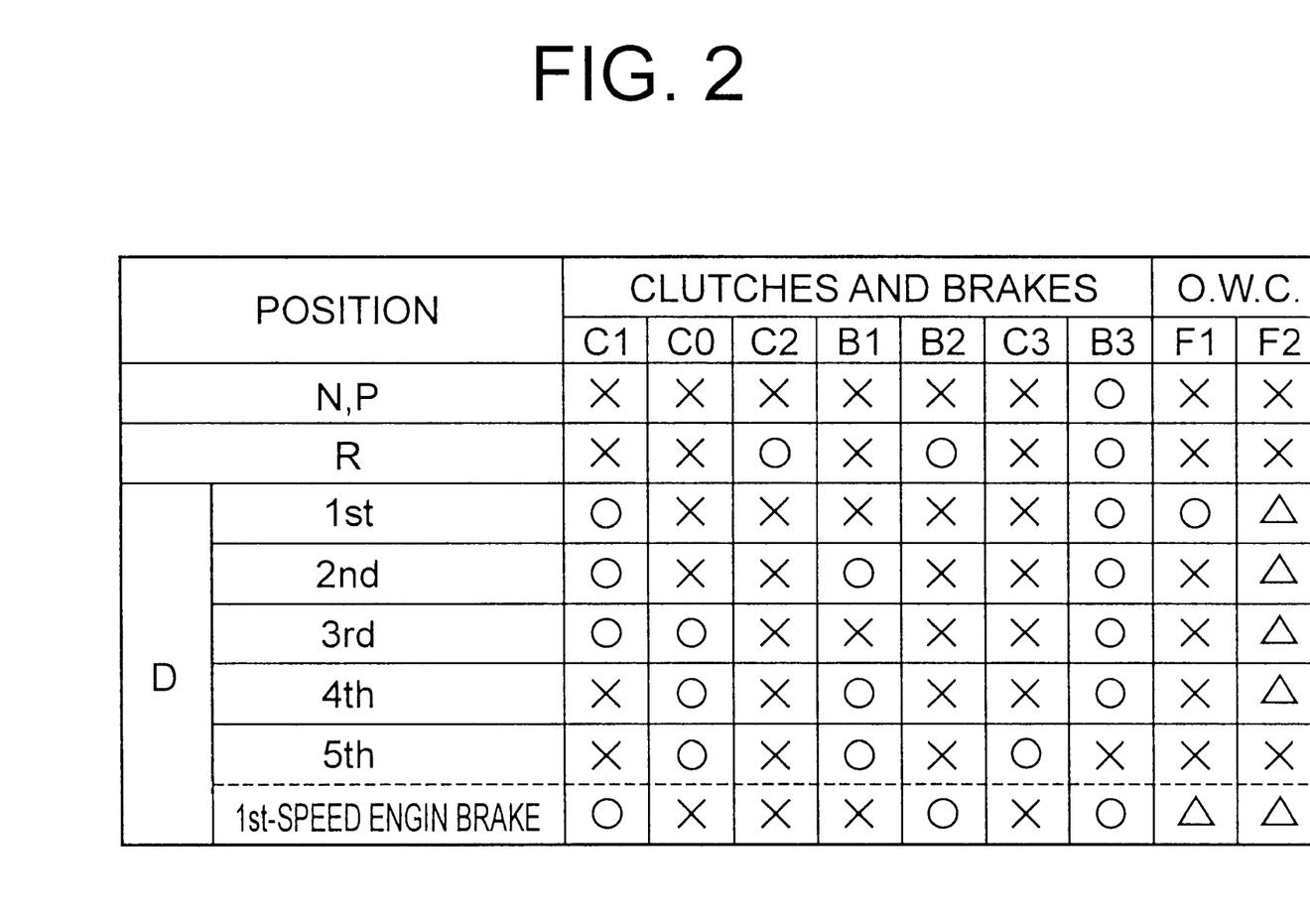
FIG. 2 is a view indicating a relationship between combinations of clutches and brakes placed in the engaged state in an automatic transmission of the vehicle drive system of FIG. 1, and operating positions of the automatic transmission which are established by the respective combinations.
Figure 3:
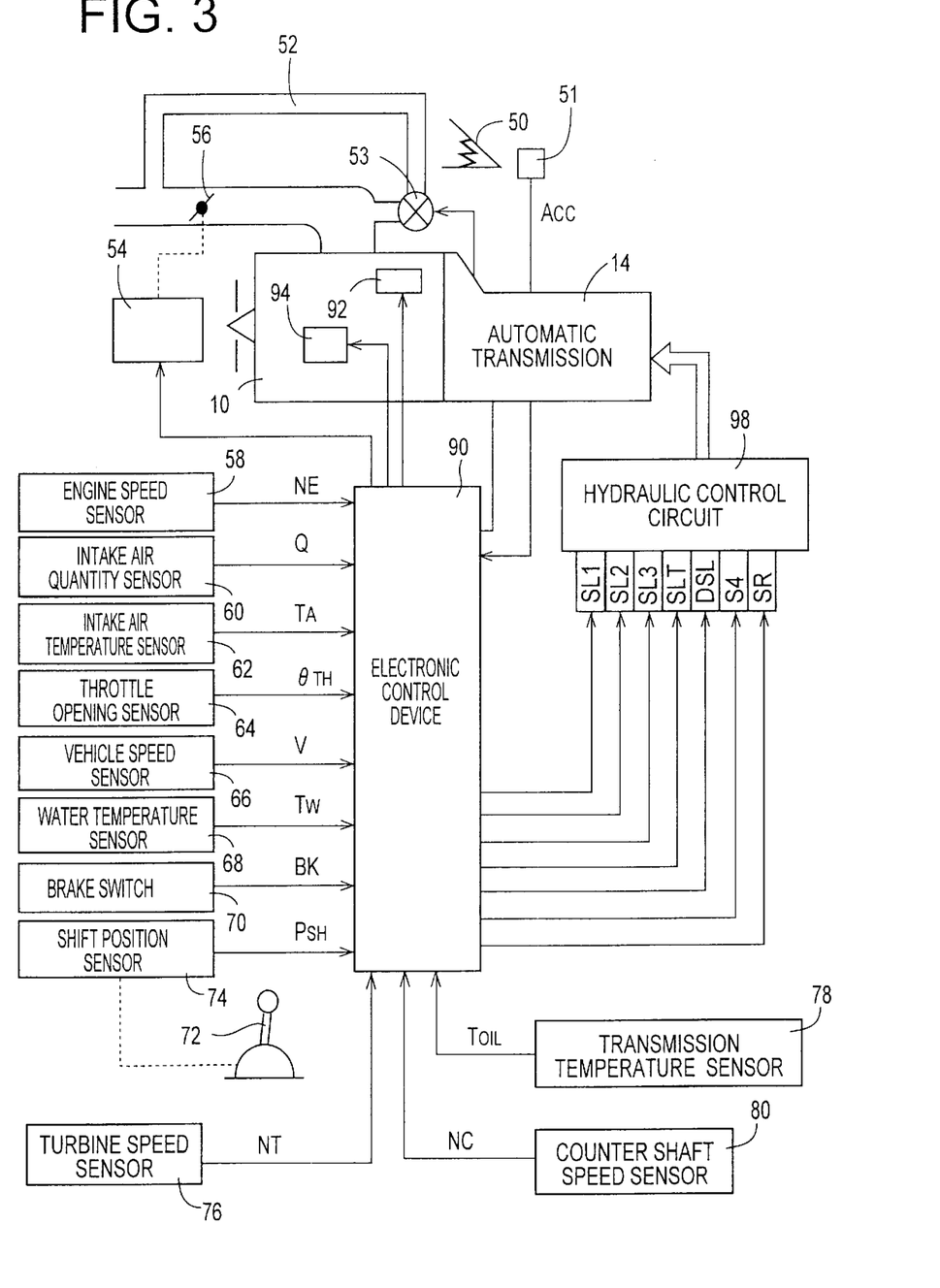
FIG. 3 is a block diagram showing a control system incorporating the control apparatus according to one embodiment of this invention for controlling an engine and the automatic transmission of the vehicle drive system of FIG. 1.
Figure 4:
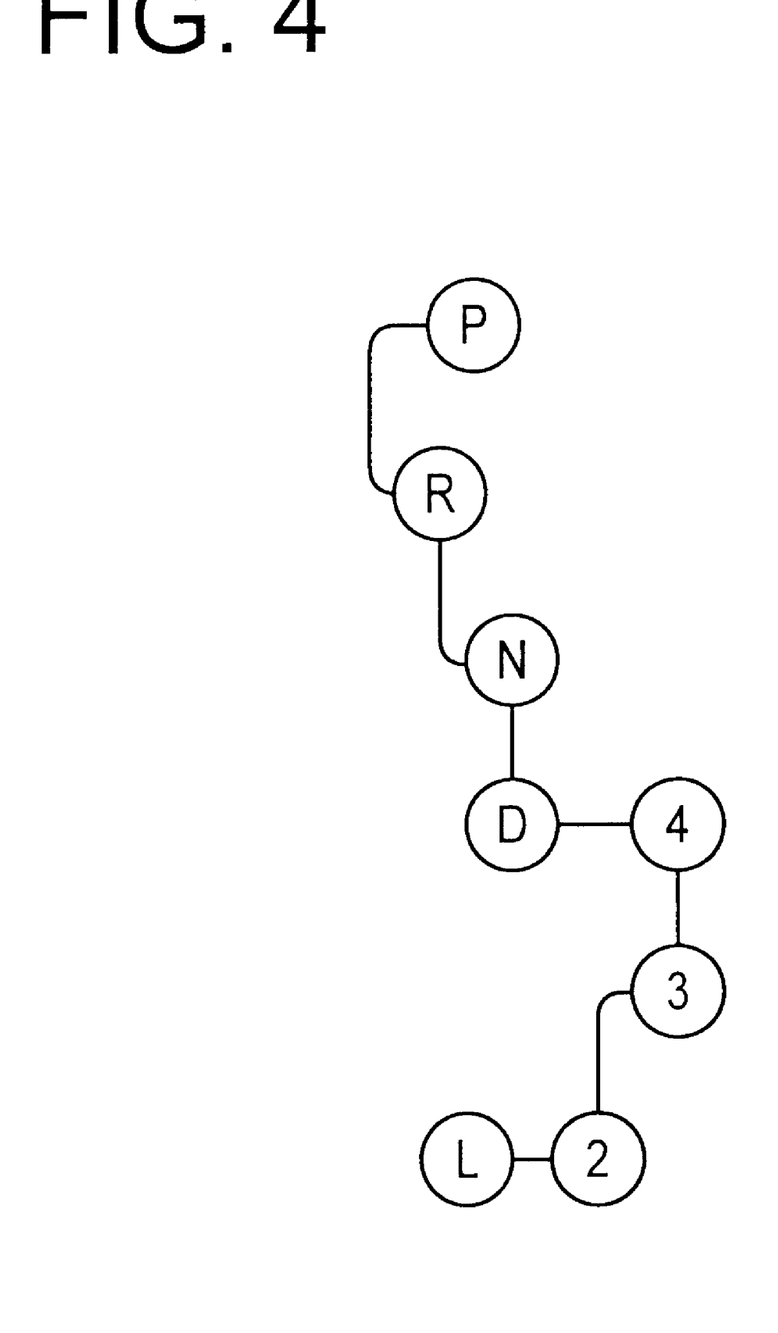
FIG. 4 is a view showing an example of operating positions of a shift lever manually operable to control the automatic transmission.

Each of the clutches C0, C1, C2, C3 and the brakes B1, B2, B3 (hereinafter referred to collectively as "clutches C" and "brakes B" where appropriate) is a hydraulically operated frictional coupling device such as a multiple-disc clutch or band brake, which is operated by a hydraulic actuator. The clutches C and brakes B are selectively engaged and released to selectively establish the five forward drive positions and one rear drive position, as indicated in FIG. 2, by way of example, by switching actions in a hydraulic control circuit 98 (shown in FIG. 3), which take place through selective energization and de-energization of linear solenoids SL1, SL2, SL3 and SLT and solenoids DSL, S4 and SR, and an axial movement of a manual shift valve (not shown), depending upon a presently selected one of a plurality of operating positions of a shift lever 72 (also shown in FIGS. 3). The five forward drive positions of the automatic transmission 14 consist of a 1.sup.st-speed position, a 2.sup.nd-speed position, a $3^{rd}$-speed position, a $4^{th}$-speed position and a $5^{th}$-speed position. In FIG. 3, "o" and "x" represent an engaged state and a released slate of the clutches C, brakes B and one-way clutches F, and "Δ" represents an engaged state of the one-way clutches F when a drive force is transmitted to the front drive wheels. The operating positions of the shift lever 72 consist of a parking position P, a rear drive position R, a neutral position N, and five forward drive positions D, 4, 3, 2 and L, as indicated in FIG. 3 wherein a pattern of movement of the shift lever 72 to select the operating positions is shown. The manual shift valve is mechanically connected to the shift lever 72, 50 that the switching actions take place in the hydraulic control circuit 98, depending upon the presently selected position of the shift lever 72.

For instance, the automatic transmission 14 is shifted up from the $4^{th}$-speed position to the $5^{th}$-speed position by engaging the clutch C3, and shifted down from the $5^{th}$-speed position to the $4^{th}$-speed position by releasing the clutch C3. Further, the automatic transmission 14 is shifted up from the $1^{st}$-speed position to the $2^{nd}$-speed position by engaging the brake B1, and shifted down from the $2^{nd}$-speed position to the first-speed position by releasing the brake B1. However, a shift-up action of the automatic transmission from the $2^{nd}$-speed position to the $3^{rd}$-speed position is achieved by engaging the clutch C0 while concurrently releasing brake B1, and a shift-down action from the $3^{rd}$-speed position to the $2^{nd}$-speed position is achieved by releasing the clutch C0 while concurrently engaging the brake B1. Thus, these shift-up and shift-down actions are achieved by concurrent engaging and releasing actions of respective two frictional coupling devices. Similarly, a shift-up action from the $3^{rd}$-speed position to the $4^{th}$-speed position is achieved by releasing the clutch C1 while concurrently engaging the brake B1, and a shift-down action from the $4^{th}$-speed position to the $3^{rd}$-speed position is achieved by engaging the clutch C1 while concurrently releasing the brake B1. Further, shift-down actions from the $2^{nd}$-speed, $3^{rd}$-speed, $4^{th}$-speed and $5^{th}$-speed positions to a $1^{st}$-speed engine-brake position (indicated in the lowermost row of FIG. 2) are achieved by concurrent engaging and releasing actions of the appropriate two frictional coupling devices. For example, the shift-down action from the $3^{rd}$-speed position to the $1^{st}$-speed engine-brake position is achieved by releasing the clutch C0 while concurrently engaging the brake B2. The $1^{st}$-speed engine-brake position is selected to apply an engine brake to the running vehicle with the automatic transmission 14 placed in the $1^{st}$-speed position.

Referring to the block diagram of FIG. 3, there is shown a control system incorporating a vehicle control apparatus constructed according to one embodiment of this invention for controlling the engine 10, automatic transmission 14, etc. of the vehicle drive system shown in FIG. 1. The control system includes an electronic control device 90 which constitutes a major portion of the vehicle control apparatus of the invention. The electronic control device 90 receives an output signal of an accelerator sensor 51, which represents an operating amount $A_{CC}$ of an accelerator member in the form of an accelerator pedal 50. The operating amount $A_{CC}$ represents an output of the engine 10 as required by a vehicle operator, that is, a required amount of output of the engine 10. An electronic throttle valve 56 is disposed in an intake pipe of the engine 10. The electronic throttle valve 56 is operated by a throttle actuator 54, which is controlled by the electronic control device 90 such that an opening angle $\theta_{TH}$ of the throttle valve 56 corresponds to the operating amount $A_{CC}$ of the accelerator pedal 50. A by-pass passage 52 is connected to the intake pipe, so as to by-pass the electronic throttle valve 56, and is provided with an ISC valve (idling speed control valve) 53, which functions to control an intake air quantity introduced into the engine 10 when the electronic throttle valve 56 is placed in its idling position. Namely, the ISC valve 53 is capable of controlling an idling speed $NE_{IDL}$ of the engine 10. The ISC valve 53 is controlled by the electronic control device 90. The electronic control device 90 receives output signals of various sensors and switches, which include the above-indicated accelerator sensor 51 for detecting the operating amount $A_{CC}$ of the accelerator pedal 50, and further include the following sensors and switch: an engine speed sensor 58 for detecting an operating speed NE of the engine 10; an intake air quantity sensor 60 for detecting an intake air quantity Q introduced into the engine 10; an intake air temperature sensor 62 for detecting a temperature $T_A$ of the intake air; a throttle opening sensor 64 for detecting the opening angle $\theta_{TH}$ of the electronic throttle valve 56; a vehicle speed sensor 66 for detecting a rotating speed $N_{OUT}$ of the counter shaft 44, which is used to calculate a running speed V of the vehicle; a water temperature sensor 68 for detecting a temperature $T_W$ of a cooling water of the engine 10; a brake switch 70 for detecting an operating state BK of a braking system (not shown); a shift position sensor 74 for detecting a presently selected position $P_{SH}$ of the shift lever 72; a turbine speed sensor 76 for detecting a rotating speed NT of the turbine impeller 24, which is equal to a rotating speed $N_{IN}$ of the input shaft 22; a transmission temperature sensor 78 for detecting a temperature $T_{OIL}$ of a working fluid in the hydraulic control circuit 98; and a counter shaft speed sensor 80 for detecting a rotating speed NC of the first counter gear G1. The throttle opening sensor 64 is provided with an idling detector switch for detecting that the throttle valve 56 is placed in its idling position.

Figure 5:
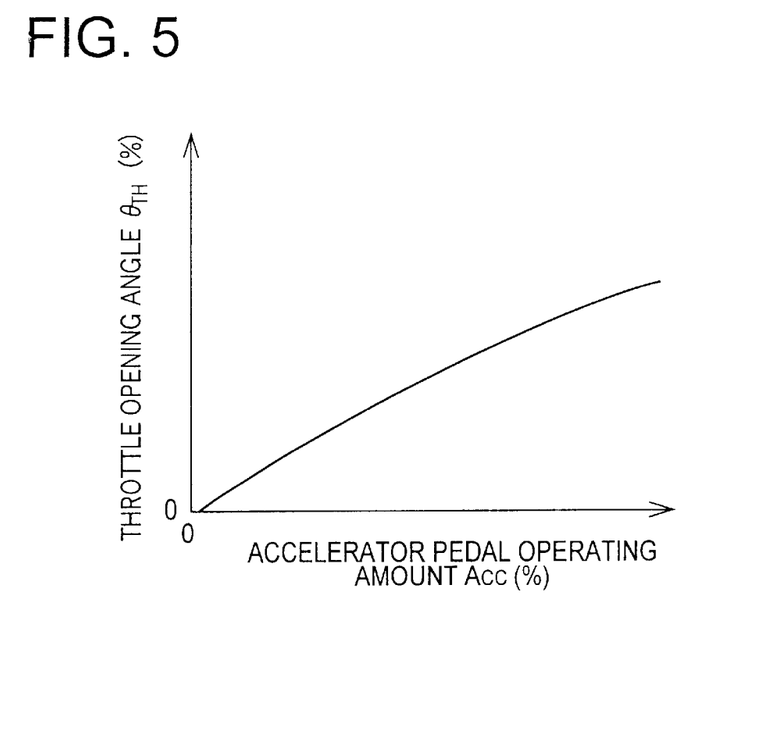
FIG. 5 is a graph indicating an example of a predetermined relationship between an operating amount $A_{cc}$ of an accelerator pedal and an opening angle $\theta TH$ of a throttle valve, which relationship is used by an electronic control device of the control system shown in FIG. 3, to control the throttle valve.

The electronic control device 90 is constituted principally by a microcomputer incorporating a central processing unit (CPU), a random-access memory (RAM), a read-only memory (ROM), and an input-output interface. The CPU operates to process input signals according to programs stored in the ROM, while utilizing a temporary data storage function of the RAM, for controlling the output of the engine 10 and the shifting actions of the automatic transmission 14. The control device 90 may be considered to include an engine controlling section for controlling the engine 10, and a transmission controlling section for controlling the automatic transmission 14. To control the output of the engine 10, the electronic control device 90 controls the throttle actuator 54 to control the opening angle $\theta_{TH}$ of the electronic throttle valve 56, and also controls a fuel injector valve 92 to control the amount of a fuel to be injected into the engine 10, an igniter 94 to control an ignition timing of the engine 10, and the ISC valve 53 to control the idling speed $N_{IDL}$ of the engine 10. For instance, the throttle actuator 54 is controlled to control the electronic throttle valve 56, on the basis of the detected operating amount $A_{CC}$ of the accelerator pedal 50, and according to a predetermined relationship between the operating amount $A_{CC}$ and the opening angle $\theta_{TH}$ of the throttle valve 56, as indicated in FIG. 5 by way of example, such that the opening angle $\theta_{TH}$ is increased with an increase in the operating amount $A_{CC}$ of the accelerator pedal 50.

Figure 6:
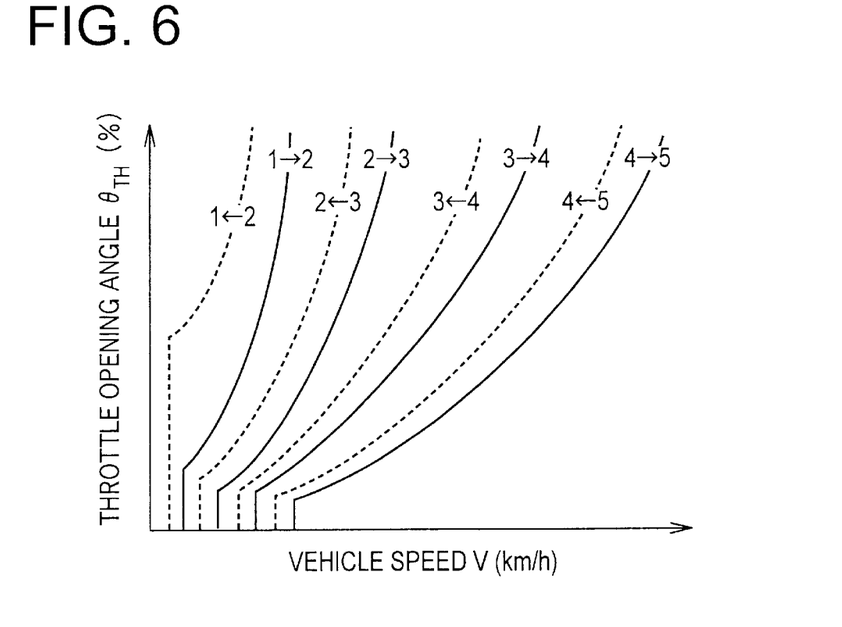
FIG. 6 is a graph showing an example of shift-up and shift-down boundary lines which are represented by stored data maps and used by the electronic control device of FIG. 3, to control shifting actions of the automatic transmission.

The automatic transmission 14 is shifted up and down on the basis of the detected opening angle $\theta_{TH}$ of the throttle valve 56 and the calculated vehicle speed V (obtained from the detected speed NT of the turbine impeller 24), and according to predetermined shift-up and shift-down boundary lines represented by data maps stored in the ROM of the control device 90. In the graph of FIG. 6, the shift-up boundary lines are indicated by solid line, while the shift-down boundary lines are indicated by broken lines. These boundary lines represent relationships between the throttle opening angle $\theta_{TH}$ and vehicle speed V. Described in detail, the forward drive position to which the automatic transmission 14 must be shifted is determined on the basis of the detected opening angle $\theta_{TH}$ and vehicle speed V, and according to the predetermined shift-up and shift-down boundary lines. The automatic transmission 14 is shifted up or down depending upon whether a point defined by the detected opening angle $\theta_{TH}$ and vehicle speed V has moved across any one of the shift-up and shift-down boundary lines in a shift-up or shift-down direction. The automatic transmission 14 is shifted to the determined operating position, by suitably energizing or de-energizing the solenoids DSL, S4, SR of the hydraulic control circuit 98, and continuously changing the duty ratios of the linear solenoids SL1, SL2, SL3 and SLT. The linear solenoids SL1, SL2 and SL3 permit direct control of the hydraulic pressure values for engaging actions of the brake B1 and the clutches C0 and C1, respectively, so as to prevent a shifting shock and deterioration of friction members of the automatic transmission 14. To suitably change the engine speed NE according to a change in the speed ratio of the automatic transmission 14 as a result of its shift-up or shift-down action, the output of the engine 10 is adjusted as needed. It will be understood from the shift-up and shift-down boundary lines shown in FIG. 6 that the automatic transmission 14 is shifted up to reduce its speed ratio when the vehicle speed V is increased, or when the opening angle $\theta_{TH}$ of the throttle valve 56 is reduced. In FIG. 6, numerals "1" through "5" represent the $1^{st}$-speed, $2^{nd}$-speed, $3^{rd}$-speed, $4^{th}$-speed and $5^{th}$-speed positions, respectively.

Figure 7:
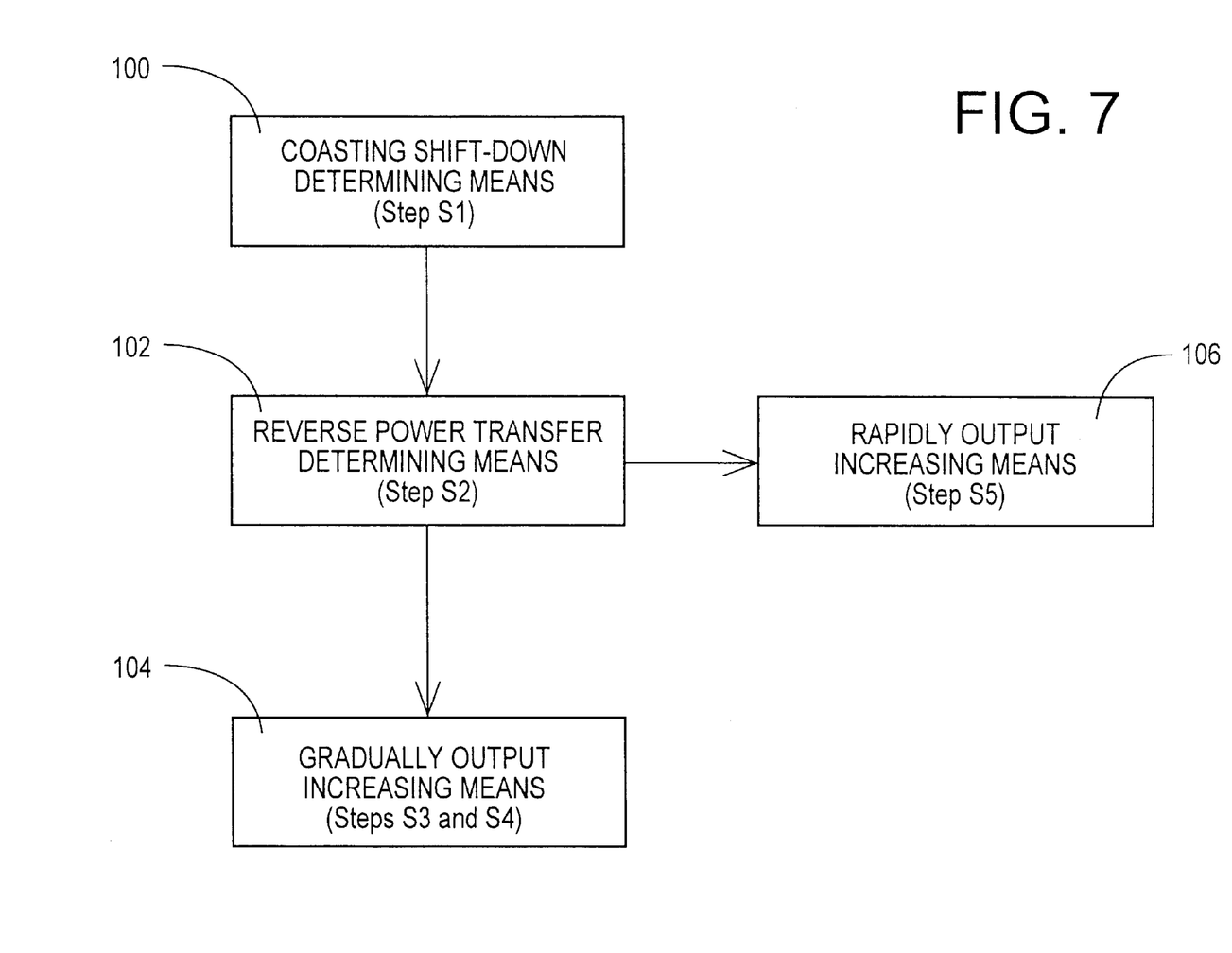
FIG. 7 is a block diagram illustrating various functional means of the electronic control device of FIG. 3 which relate to controlling of the engine to increase its operating speed upon a shift-down action of the automatic transmission during a coasting run of the vehicle.
Figure 8:
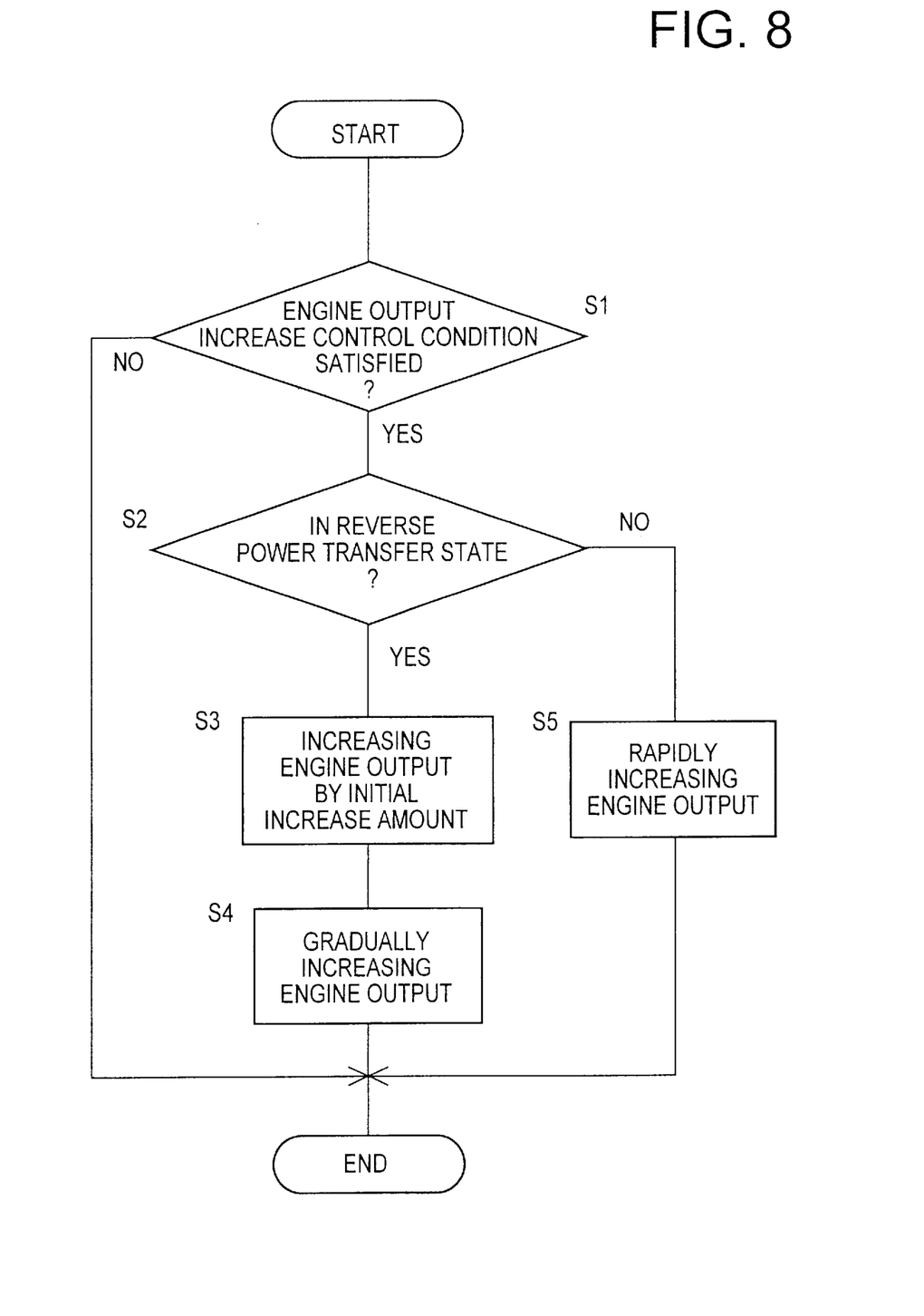
FIG. 8 is a flow chart illustrating a control routine executed by the electronic control device including the functional means illustrated in FIG. 7.

The vehicle control apparatus of the electronic control device includes functional means as indicated in FIG. 7, which are operable upon a shift-down action of the automatic transmission 14 which takes place during a coasting run of the vehicle with the accelerator pedal 50 placed in its non-operated position. The vehicle control apparatus is arranged to execute a control routine illustrated in the flow chart of FIG. 8. The functional means of the vehicle control apparatus include coasting shift-down determining means 100, reverse power transfer determining means 102, gradually output increasing means 104 and rapidly output increasing means 106. The coasting shift-down determining means 100 is arranged to determine whether a shift-down action of the automatic transmission 14 is required while the vehicle is coasting. The reverse power transfer determining means 102 is arranged to determine whether the vehicle drive system is placed in a reverse power transfer state in which the speed NE of the engine 10 is lower than the speed NT of the turbine impeller 24 of the torque converter 12 (which is equal to the speed $N_{IN}$ of the input shaft 22 of the automatic transmission 14). The gradually output increasing means 104 is arranged to gradually or slowly increase the opening angle of the ISC valve 53, for gradually or slowly increasing the output of the engine 10. The rapidly output increasing means 106 is arranged to rapidly increase the opening angle of the ISC valve 53, for rapidly increasing the output of the engine 10. Step S1 of the routine of FIG. 8 is implemented by the coasting shift-down determining means 100, and step S2 is implemented by the reverse power transfer determining means 102 Steps S3 and S4 are implemented by the gradually output increasing means 104, and step S5 is implemented by the rapidly output increasing means 106. In the present embodiment, the ISC valve 53 controlled by the gradually output increasing means 104 and the rapidly output increasing means 106 functions as an output controlling element operable to control the output of the drive power source in the form of the engine 10.

The control routine of FIG. 8 is initiated with step S1 to determine whether a predetermined condition for increasing the output of the engine 10 to increase the speed NE of the engine 10 is satisfied, that is, whether a shift-down action of the automatic transmission 14 is required in a coasting run of the vehicle. In the present embodiment, a SHIFT-DOWN flag is set to "1" when a requirement for a shift-down action of the automatic transmission 14 is detected on the basis of the detected opening angle $\theta_{TH}$ of the throttle valve 56 and vehicle speed V and according to the shift-down boundary lines of FIG. 6. An affirmative decision (YES) is obtained in step S1, that is, the predetermined condition for increasing the output of the engine 10 is satisfied, when the SHIFT-DOWN flag is set at "1", and the idling detector switch of the throttle opening sensor 64 is in the ON state indicating that the throttle valve 56 is in the idling position, while the vehicle speed V is not zero. Step S1 may be modified so as to determine that the shift-down action of the automatic transmission 14 is required in the coasting run, when the brake switch 70 is in the ON state indicating an operation of the braking system and when the turbine speed sensor 76 and the counter shaft speed sensor 80 relating to the shift-down action in the coasting run are normal, as well as when the above-indicated predetermined condition is satisfied. When the affirmative decision (YES) is obtained in step S1, the control flow goes to step S2. In the specific example shown in the time chart of FIG. 9, the affirmative decision (YES) is obtained in step S1 at a point of time t1.

Figure 9:
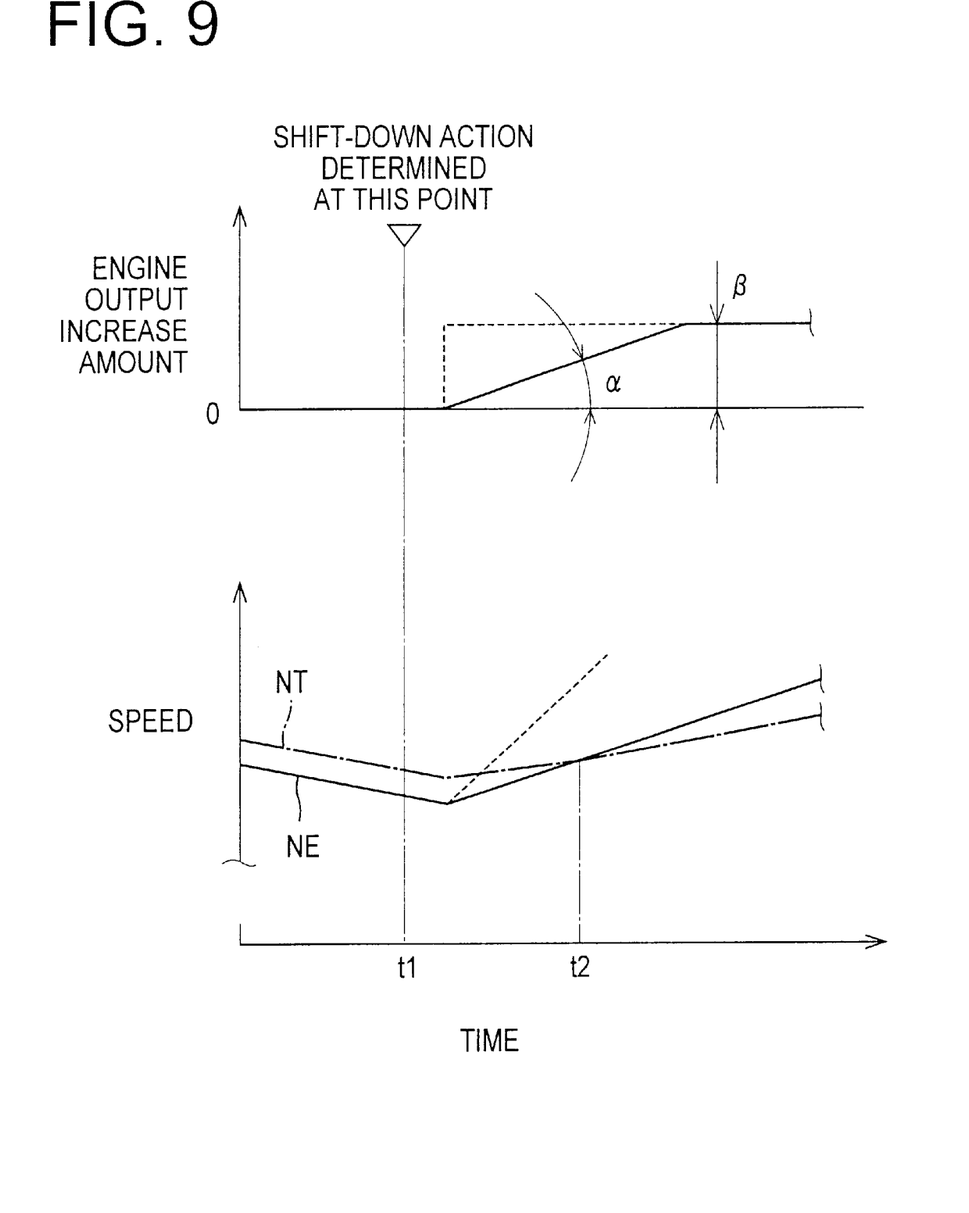
FIG. 9 is a time chart indicating changes of various parameters when the control routine of FIG. 8 is executed to increase the operating speed of the engine when the vehicle drive system is placed in a reverse power transfer state.

Step S2 is formulated to determine whether the vehicle drive system is placed in the reverse power transfer state in which the speed NE of the engine 10 is lower than the speed NT of the turbine impeller 24, at the point of time t1, as indicated in FIG. 9. The turbine speed NT is the output speed of the torque converter 12 which is a fluid-operated power transmitting device. The vehicle drive system may be placed in the reverse power transfer state with a decrease of the engine speed NE during the coasting run of the vehicle, if a fuel cut control to cut a fuel supply to the engine 10 is effected to improve the fuel economy of the vehicle or to apply an engine brake to the vehicle, or when an air conditioning system or other device operable by the engine 10 is activated. Step S2 must be modified as described below where the vehicle control apparatus is adapted to control the ISC valve 53 to control the output of the engine 10 during a coasting run of the vehicle such that the engine speed NE is slightly higher than the turbine speed NT, so as to permit the vehicle to be driven with a high response to a subsequent operation of the accelerator pedal 50 at the end of the coasting run. In this case where the engine speed NE is higher than the turbine speed NT upon a shift-down action of the automatic transmission 14 during a coasting run of the vehicle, step S2 is formulated to determine whether a speed difference (NE−NT) is smaller than a predetermined threshold NSLPISC, which is a positive value, for instance, a few tens of r.p.m. The threshold NSLPISC is determined to assure accurate determination in step S2, irrespective of detection errors of the speed sensors 58, 80.

When the reverse power transfer state is detected, that is, an affirmative decision (YES) is obtained in step S2, the control flow goes to step S3 to control the ISC valve 53 for increasing the output of the engine 10 by a predetermined initial amount, that is, to control the opening angle of the ISC valve 53 to be a predetermined initial value. If the fuel cut control is being effected at this time, the fuel injector valve 92 is operated in step S3, to resume a fuel supply for restarting the engine 10. The initial amount of increase of the engine output is a predetermined constant value, which may be zero. However, the initial amount may be calculated according to a stored data map and on the basis of a speed difference (NT−NE) or the specific kind of the shift-down action (e.g., from the $3^{rd}$-speed position to the $2^{nd}$-speed position) of the automatic transmission 14 which has been detected in step S1. Step S3 is followed by step S4 to increase the opening angle of the ISC valve 53 to a predetermined target value $\beta$ at a predetermined rate $\alpha$, to increase the engine speed NE at a predetermined rate. However, the increase rate $\alpha$ and the target value $\beta$ of the opening angle of the ISC valve 53 may be calculated according to a stored data map and on the basis of the speed difference (NT−NE) or the kind of the shift-down action of the automatic transmission 14. Alternatively, only the target value $\beta$ may be calculated on the basis of the speed difference (NT−NT). In this case, the increase rate $\alpha$ is held constant irrespective of a change in the running condition of the vehicle.

Referring to the time chart of FIG. 9, there are shown a change in the opening angle of the ISC valve 53 (namely, the amount of increase of the engine output), and changes in the engine speed NE and turbine speed NT, while the vehicle drive system is placed in the reverse power transfer state. The opening angle of the ISC valve 53 is linearly increased at the predetermined rate $\alpha$ as indicated by solid line, so that the engine speed NE is gradually or slowly increased, so as to exceed the turbine speed NT at a point of time t2. A straight line representing the engine speed NE intersects a straight line representing the turbine speed NT, at a relatively small angle of intersection. As a result, amounts of noise and shock due to reversal of the direction of torque transmission through the torque converter 12 are reduced. The initial increase amount and the increase rate $\alpha$ of the opening angle of the ISC valve 53 are suitably determined on the basis of the engaging characteristics of the clutches C and brakes B, since an excessively slow increase of the engine speed NE will cause an abrupt rise of the turbine and engine speeds NT, NE upon engaging actions of the appropriate clutch or clutches C and/or brake or brakes B, which engaging actions take place to effect the required shift-down action of the automatic transmission 14. The abrupt rise may cause a variation of the vehicle drive force and deterioration of the friction members of the clutches C and brakes B. At the point of time t2 indicated in FIG. 9, the direction in which the torque is transmitted through the torque converter 12 is reversed.

Broken lines in FIG. 9 indicate an instantaneous increase of the opening angle of the ISC valve 56 to the target value $\beta$, and an abrupt increase of the engine speed NE so as to exceed the turbine speed NT in a short time. Namely, the straight broken line indicating the abrupt increase of the engine speed NE intersects the straight solid line representing the turbine speed NT, at a comparatively large angle of intersection. In this case, the direction of the torque transmission through the torque converter 12 is suddenly reversed, causing comparatively large amounts of noise and shock.

The moment at which an increase of the opening angle of the ISC valve 53 is initiated to increase the engine speed NE must be determined such that each clutch C or brake B to be released to effect the required shift-down action of the automatic transmission 14 has been fully released before the point of time t2. If the engine speed NE has been increased to exceed the turbine speed NT to initiate a normal power transfer state before the clutch C or brake B has been fully released, there arises an undesirable change in the vehicle drive force. In view of a delayed response of the output of the engine 10 to an increase of the opening angle of the ISC valve 53, however, the increase of the opening angle may be initiated upon or immediately after the moment of determination that the shift-down action of the automatic transmission 14 is required.

If a negative decision (NO) is obtained in step S2, that is, if the vehicle drive system is not placed in the reverse power transfer state, an increase of the engine speed NE will not cause reversal of the direction of torque transmission through the torque converter 12, since the engine speed NE is higher than the turbine speed NT. In this case, the control flow goes to step S5 to rapidly increase the opening angle of the ISC valve 53 to the target value β for rapidly increasing the engine speed NE to a value corresponding to the forward drive position of the automatic transmission 14 which has been established by the shift-down action.

As described above, the vehicle control apparatus according to the present embodiment is arranged to determine in step S2 whether the vehicle drive system is placed in the reverse power transfer state wherein the engine speed NE is lower than the turbine speed NT, and gradually increase the engine speed NE in steps S3 and S4 for gradually increasing the opening angle of the ISC valve 53 at the predetermined rate α, if it is determined that the vehicle drive system is placed in the reverse power transfer state. Thus, the engine speed NE is slowly increased so as to exceed the turbine speed NT, so that the direction of torque transmission through the torque converter 12 is slowly reversed to positively drive the vehicle, making it possible to reduce the amounts of noise and shock due to the reversal of the torque transmitting direction. As shown in FIG. 9, the opening angle of the ISC valve 53 has been increased to the target value β only after the engine speed NE has exceeded the turbine speed NT, so that the direction of torque transmission through the torque converter 12 is slowly changed from the reverse direction to the forward direction to drive the vehicle.

While the preferred embodiment of this invention has been described in detail by reference to the accompanying drawings, for illustrative purpose only, it is to be understood that the present invention may be embodied with various changes, modifications and improvements which may occur to those skilled in the art, in the light of the foregoing teachings.

What is claimed is:

1. An apparatus for controlling a drive system of an automotive vehicle including a drive power source, a fluid-operated power transmitting device connected to said drive power source, and an automatic transmission arranged to transmit a rotary motion of the fluid-operated power transmitting device to drive wheels of the vehicle such that a speed ratio which is a ratio of an input speed of the automatic transmission to an output speed thereof is variable, said apparatus being arranged to increase an output of said drive power source for increasing an operating speed of said drive power source upon a shift-down action of said automatic transmission so as to increase said speed ratio during a coasting run of the vehicle in which the output of said drive power source is not transmitted to said drive wheels, said apparatus comprising:

an output controlling element operable to control the output of said drive power source; and gradually output increasing means operable upon said shift-down action of said automatic transmission during said coasting run of the vehicle, while said drive system is placed in a reverse power transfer state in which the operating speed of said drive power source is lower than an output speed of said fluid-operated power transmitting device, said gradually output increasing means controlling said output controlling element to increase the output of said drive power source so as to gradually increase said operating speed of said drive power source at a predetermined rate, and such that the output of said drive power source is increased to a predetermined target value after the operating speed of said drive power source has exceeded said output speed of said fluid-operated power transmitting device.

2. An apparatus according to claim 1, further comprising reverse power transfer determining means operable upon said shift-down action of said automatic transmission during said coasting run of the vehicle, for determining whether said drive system is placed in said reverse power transfer state, and wherein said gradually output increasing means is operated to control said output controlling element so as to gradually increase the operating speed of the drive power source, when said reverse power transfer determining means has determined that said drive system is placed in said reverse power transfer state.

3. An apparatus according to claim 1, wherein said output controlling element is operable to change the output of said drive power source, irrespective of an operation of a vehicle accelerating member by an operator of the vehicle.

4. An apparatus according to claim 3, wherein said output controlling element is an idling speed control valve operable to change an idling speed of said drive power source.

5. An apparatus according to claim 1, wherein said gradually output increasing means controls said output controlling element such that the operating speed of said drive power source is increased at a predetermined constant rate.

6. An apparatus according to claim 1, wherein said gradually output increasing means controls said output controlling element such that the operating speed of said drive power source is increased to a predetermined constant value.

7. An apparatus according to claim 1, wherein said gradually output increasing means controls said output controlling element such that the operating speed of said drive power source is increased at a rate which is determined by a kind of said shift-down action of said automatic transmission.

8. An apparatus according to claim 1, wherein said gradually output increasing means controls said output controlling element such that the operating speed of said drive power source is increased to a target value which is determined by a kind of said shift-down action of said automatic transmission.

9. An apparatus according to claim 1, wherein said gradually output increasing means controls said output controlling element such that the operating speed of said drive power source is increased at a rate which is determined by a difference between the operating speed of said drive power source and an output speed of said fluid-operated power transmitting device.

10. An apparatus according to claim 1, wherein said gradually output increasing means controls said output controlling element such that the operating speed of said drive power source is increased to a target value which is determined by a difference between the operating speed of said drive power source and an output speed of said fluid-operated power transmitting device.

11. An apparatus according to claim 1, wherein said gradually output increasing means control said output controlling element such that a rate of increase of the operating speed of said drive power source continuously varies.

12. An apparatus according to claim 1, wherein said gradually output increasing means control said output controlling element such that the operating speed of said drive power source is initially increased by an initial increase amount which is determined by at least one of a kind of said shift-down action of said automatic transmission and a difference between the operating speed of said drive power source and an output speed of said fluid-operated power transmitting device.

13. An apparatus according to claim 12, wherein said initial increase amount is determined on the basis of said at least one of said kind of said shift-down action and said difference and according to a stored data map representative of a predetermined relationship between said initial increase amount and said at least one of said kind of said shift-down action and said difference.

14. An apparatus according to claim 1, wherein said gradually output increasing means control said output controlling element such that the operating speed of said drive power source is increased at a rate which is determined by at least one of a kind of said shift-down action of said automatic transmission and a difference between the operating speed of said drive power source and an output speed of said fluid-operated power transmitting device.

15. An apparatus according to claim 14, wherein said rate of increase of the operating speed is determined on the basis of said at least one of said kind of said shift-down action and said difference and according to a stored data map representative of a predetermined relationship between said rate and said at least one of said kind of said shift-down action and said difference.

16. An apparatus according to claim 1, further comprising rapidly output increasing means operable upon said shift-down action of said automatic transmission during said coasting run of the vehicle, while said drive system is not placed in said reverse power transfer state, said rapidly output increasing means controlling said output controlling element so as to rapidly increase said operating speed of said drive power source at a rate higher than said predetermined rate at which said operating speed of said drive power source is increased by said gradually output increasing means.

* * * * *